United States Patent
Kikuchi et al.

(10) Patent No.: US 6,793,992 B2
(45) Date of Patent: Sep. 21, 2004

(54) MOLDED PRODUCT FOR CUSHIONING MATERIAL, AND PRODUCTION PROCESS AND RECOVERY THEREOF

(75) Inventors: Yoshihiko Kikuchi, Kanagawa (JP); Chieko Mihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 10/190,509

(22) Filed: Jul. 9, 2002

(65) Prior Publication Data

US 2003/0011105 A1 Jan. 16, 2003

(30) Foreign Application Priority Data

Jul. 10, 2001 (JP) ........................................ 2001/209034
Jul. 10, 2001 (JP) ........................................ 2001/209035

(51) Int. Cl.[7] .............................................. B29D 22/00
(52) U.S. Cl. .................... 428/34.2; 428/35.6; 428/35.7; 428/36.92; 524/9; 524/14; 524/34; 264/405; 264/122; 264/123
(58) Field of Search ............................... 428/34.2, 35.6, 428/35.7, 36.92, 532–537.5; 524/9, 14, 34; 264/405, 122, 123, 109–128, 489, 491

(56) References Cited

U.S. PATENT DOCUMENTS 4,374,885 A * 2/1983 Ikeda et al. .................. 428/160
4,443,286 A * 4/1984 Ikeda et al. .................. 156/245
6,252,027 B1 6/2001 Mihara et al. ............... 527/311
6,299,726 B1 * 10/2001 Andersen et al. ............... 162/4
6,468,668 B1 10/2002 Minami et al. .............. 428/533
2003/0005857 A1 1/2003 Minami et al. ......... 106/162.71

FOREIGN PATENT DOCUMENTS

| EP | 0 987 296 A1 | 3/2000 |
| JP | 7-267276 | 10/1995 |
| JP | 2000-297206 | 10/2000 |
| JP | 2000-313702 | 11/2000 |
| JP | 2000-328028 | 11/2000 |

* cited by examiner

Primary Examiner—Stephen J. Lechert, Jr.
(74) Attorney, Agent, or Firm—Fitzpatrick, Cella, Harper & Scinto

(57) ABSTRACT

A cushioning molded product is provided which is produced by binding a vegetable fiber with a copolymer of a saccharide and an aliphatic dicarboxylic acid to conduct molding. Further a process is provided for producing a cushioning molded product from a copolymer of a saccharide and an aliphatic dicarboxylic acid, and a vegetable fiber, the process comprising (a) mixing or adhering the copolymer and the vegetable fiber, and (b) molding the resulting mixture into an intended shape by heating the mixture to bind the vegetable fiber with the copolymer.

33 Claims, No Drawings

MOLDED PRODUCT FOR CUSHIONING MATERIAL, AND PRODUCTION PROCESS AND RECOVERY THEREOF

BACKGROUND OF THE INVENTION

1. Field of the Invention

The present invention relates to a molded product for a cushioning material (hereinafter referred to as "cushioning molding product") composed mainly of a vegetable fiber, and to a process for production and recovery thereof.

2. Related Background Art

Molded products produced by binding and molding a vegetable fiber such as paper, cotton, straw, and strained lees with a suitable binder are widely used as a cushioning material for impact absorption.

In recent years, molded pulp products are coming to partially replace conventional foamed polystyrene-molded products used as a cushioning packing material for home electric appliances. The molded pulp products exhibit excellent properties of absorbing drop-impact and sound-wave, and readily moldable into sheets, pellets, or an arbitrary shape to fit to the shape of the package.

The molded pulp product is basically a paper product, and can readily be regenerated after use by fiber opening and sheet making. Besides, in the case where the regeneration is not suitable owing to the deterioration of the properties or other reasons, the molded pulp product can be burned or buried without releasing a toxic component to cause less adverse effect on the environment. Especially, the molded pulp product is advantageous from the standpoint of effective utilization of resources.

Various binders are used for producing the cushioning molded products. As the binders, polysaccharides are widely used in consideration of compatibility with the vegetable fiber and low environmental loading, the polysaccharides including starches, agars, mannan, alginic acid, and carboxymethylcellulose.

These polysaccharides, however, do not always have good processability because of insolubleness in solvents except water, lack of thermoplasticity, or other reasons. Use of a usual thermoplastic resin is disclosed (Japanese Patent Application Laid-Open No. 7-267276). However, the usual thermoplastic resin does not have sufficient compatibility with vegetable fibers. The polysaccharides are derived from a material other than the fiber.

The molded pulp product has disadvantages resulting from the production process. That is, molded pulp products are conventionally produced by a wet sheet-making process employing water, similarly as paper sheets. This process comprises drying of an aqueous slurry, requiring a long time and consuming much energy for the drying, and the productivity thereof is not high. In particular, this production process is disadvantageous for production of thick molded products of less directional dependence in cushioning properties for drop impact. Moreover, the large energy consumption generally causes emission of carbon dioxide gas, which is a cause of greenhouse effect. This is inconsistent with the intension of environmental protection of the molded pulp product itself.

The present invention intends to provide a cushioning molded product, which is excellent in strength, processability and recyclability, produced from a vegetable fiber as the main source material by maximally utilizing the feature of the vegetable fiber. The present invention intends to also provide the process for production of the cushioning molded product.

The present invention further intends to provide a process of producing the cushioning molded products from the vegetable fiber as the main source material with higher productivity and lower environmental loads.

SUMMARY OF THE INVENTION

The present invention provides a cushioning molded product produced by binding a vegetable fiber with a copolymer of a saccharide and an aliphatic dicarboxylic acid to conduct molding.

In a preferred embodiment, the vegetable fiber is paper or a fiber obtained by fiber opening of paper.

The saccharide is preferably a monosaccharide or an oligosaccharide with a polymerization degree of 6 or less. The saccharide may be partially substituted with an acetyl group. The number of substituting acetyl groups is preferably in the range of 0 to 2 per monosaccharide unit.

In a preferred embodiment of the present invention, the saccharide is a product of decomposition of a vegetable fiber, in particular, a product of decomposition of paper.

The aliphatic dicarboxylic acid preferably has an alkylene chain having 4 to 10 carbon atoms for the monosaccharide, and 6 to 10 carbon atoms for the oligosaccharide.

The vegetable fiber is contained at a content ranging preferably from 50 to 99 wt %, and the copolymer is contained at a content ranging preferably from 1 to 50 wt %.

The copolymer preferably contains a component with a weight-average molecular weight of 500 to 10000 at a content from 50 to 100 wt %.

The present invention also provides a process for producing the cushioning molded product from a copolymer of a saccharide and an aliphatic dicarboxylic acid, and a vegetable fiber, the process comprising:

(a) mixing or adhering the copolymer and the vegetable fiber, and
(b) molding a mixture resulting from step (a) into an intended shape by heating the mixture to bind the vegetable fiber with the copolymer.

In a preferred embodiment, the mixing step includes a step of mixing the copolymer and the vegetable fiber by use of a solvent containing water at a content ranging from 0 to 50%.

In another preferred embodiment, the production process comprises the steps of:

(a) adhering the copolymer with a pelletized vegetable fiber,
(b) filling a mixture of the pelletized vegetable fiber and the copolymer resulting from step (a) into a molding vessel, and
(c) molding the mixture into an intended shape by heating the mixture to bind the vegetable fiber with the copolymer.

In another preferred embodiment, the production process comprises the steps of:

(a) forming the vegetable fiber into an intended shape,
(b) adhering the copolymer with the vegetable fiber, and
(c) molding a mixture of the vegetable fiber and the copolymer resulting from step (b) by heating the mixture to bind the vegetable fiber with the copolymer.

In another preferred embodiment of the present invention, the mixing or adhering step includes a step of sprinkling powder of the copolymer onto a vegetable fiber impregnated with an organic solvent to allow the copolymer to adhere onto the fiber. Otherwise, the mixing or adhering step includes a step of spraying a solution of the copolymer in an organic solvent onto the vegetable fiber followed by drying to allow the copolymer to adhere onto the fiber.

In a preferred embodiment, the molding step includes the steps of filling the mixture of the copolymer and the vegetable fiber into a molding vessel, and heating the mixture to bind the vegetable fiber with the copolymer.

The molding step preferably comprises softening or melting the copolymer by heating. The heating is preferably conducted by irradiation of an electromagnetic wave.

The present invention also provides a method of recovering at least one of the vegetable fiber, saccharide, and aliphatic dicarboxylic acid from the cushioning molded product by treating the cushioning molded product with at least one of an acid, an alkali, high-temperature high-pressure water, and an enzyme.

The present invention also provides a cushioning molded product comprising a vegetable fiber as a main constituent, and a copolymer of a saccharide and an aliphatic dicarboxylic acid as a binder, wherein at least one of the vegetable fiber, the saccharide, the aliphatic dicarboxylic acid is a product recovered by the aforementioned recovery method.

The present invention further provides a package packed by use of the cushioning molded product, a wrapped matter wrapped by use of the cushioning molded product, and a sound absorption material and building material employing the cushioning molded product.

DESCRIPTION OF THE PREFERRED EMBODIMENTS

The inventors of the present invention disclosed a compatible complex composed of a polyester containing a saccharide in the main chain and cellulose (Japanese Patent Application Laid-Open No. 2000-313702), and a biodegradable adhesive employing a polyester containing a saccharide in the main chain (Japanese Patent Application Laid-Open No. 2000-328028). The above techniques utilize complex formation due to hydrogen bonding of the hydroxyl groups of the saccharide. After comprehensive investigation for more effective utilization of the above techniques, the inventors of the present invention found that (1) a molded product of various fibers such as cellulose bound with the polyester containing a saccharide in the main chain has excellent properties of absorbing drop impact and sound, and is suitable for use as a cushioning material, and (2) since the polyester containing a saccharide in the main chain is soluble in a nonaqueous solvent, a mixture of a vegetable fiber and the polyester enables heating and drying in a short time, and can readily be molded into a relatively voluminous and thick cushioning material relative to its surface area.

Thereby, the present invention has been accomplished.

The present invention provides a cushioning molded product produced by molding a vegetable fiber as a component by use of a copolymer of a saccharide and an aliphatic dicarboxylic acid as a binder.

The present invention is described below in detail.
(Vegetable Fiber)

The useful vegetable fiber material includes paper, cotton, straw, wood meal, strained lees, and pulp. From the standpoint of environment protection, it is very advantageous to use waste resources resulting from industrial production: waste resources such as used paper, textile material waste, saw dust, strained lees such as bagasse.

(Saccharide Copolymer)

The binder employed in the present invention is a thermoplastic copolymer containing a saccharide in the main chain. The thermoplasticity is effective for promotion of binding in a pressing operation, and for facilitation of the secondary process after the molding process as well as foaming extrusion molding.

A first advantage of the use of the saccharide in the binder is sufficient adhesiveness as the binder owing to the affinity between the saccharides including hydrogen bonding, because the vegetable fiber is constituted of a polysaccharide such as cellulose, and xylan. Similar effects are expected to be achieved by a polyolefin or a like polymer having saccharide as a side chain. However, the ones having the saccharide in the main chain can be synthesized much more simply.

A second advantage thereof is ease of production of the source saccharide by depolymerization of the polysaccharide constituting the vegetable fiber used as the main component of the cushioning molded product. Fiber waste eliminated owing to excessive fineness and insufficient strength after the fiber opening operation, or used paper having a larger content of a foreign matter can be effectively utilized as the binder-constituting component without discarding them.

The saccharide includes monosaccharides and oligosaccharides of not larger than hexasaccharide. More specifically, the monosaccharide includes glucose, mannose, xylose, arabinonse, galactose, and glucosamine. The oligosaccharide includes cellobiose, maltose, lactose, isomaltose, nigerose, trehalose, melibiose, chitobiose, cellotriose, cellotetraose, cellopentaose, cellohexaose, maltotriose, maltotetraose, maltopentaose, and maltohexaose. The oligosaccharide is not limited to those constituted of a single monosaccharide, but may be the one constituted of plural kinds of monosaccharides. The monosaccharides and the oligosaccharides may be partially substituted by a substituent such as an acetyl group. However, in view of the adhesiveness, at least a part of the hydroxyl groups are preferably kept unsubstituted. The substitution degree is not more than that in which two groups are substituted per one monosaccharide unit. A small amount of a polysaccharide may be contained as a subsidiary component.

A method for producing the monosaccharide or the oligosaccharide from the polysaccharide constituting the vegetable fiber is hydrolysis scission of the glycoside linkage of the polysaccharide by an acid such as sulfuric acid and hydrochloric acid, or an enzyme.

An aliphatic dicarboxylic acid is used as a component to be copolymerized with the saccharide. To obtain a thermoplastic copolymer, the alkylene chain has 4 or more carbon atoms for the monosaccharide, and 6 or more carbon atoms for the oligosaccharide excluding the carbons of the functional groups (Japanese Patent Application Laid-Open No. 2000-297205). The longer alkylene chain will give higher hydrophobicity and can render difficult the mixing with the fiber. Therefore, in the present invention, the carbon number of the alkylene chain is limited to be not more than 10. Specifically the aliphatic dicarboxylic acid includes adipic acid, pimelic acid, suberic acid, and sebacic acid; and acid chlorides, acid salts, and short chain alkyl esters of the above dicarboxylic acids. The aliphatic dicarboxylic acid is condensed with the saccharide in a molten state or solution state in the presence of a suitable catalyst, if necessary.

The copolymer as the binder preferably contains a component with a weight-average molecular weight ranging from 500 to 10000 unremoved for obtaining suitable hygroscopicity for effective binding in the present invention. In view of the binding strength, a component of a higher molecular weight is preferably contained simultaneously. On the other hand, a component of a molecular weight of lower than 500 is preferably excluded since the lower molecular component is liable to make instable the physical properties of the molded product.

The aforementioned copolymer component having a weight-average molecular weight ranging from 500 to 10000 is preferably contained in the copolymer at a content ranging from 50 to 100 wt %.

The vegetable fiber is contained in the cushioning molded product at a content ranging from 50 to 99 wt %, preferably from 50 to 85 wt %, and the copolymer is contained at a content ranging from 1 to 50 wt %, preferably from 15 to 50 wt %.

(Process for Production)

The vegetable fiber is subjected to fiber opening as necessary, and is mixed with a saccharide copolymer as the binder. The mixture is heated or air-dried in a suitable molding vessel to cause binding with the binder for forming a molded product. The mixing can be conducted by use of water as a solvent as in the conventional method, or by use of an organic solvent singly or in combination with water. For shorter drying time, the content of water in the solvent is preferably in the range from 0 to 50 wt %. The organic solvent includes methanol, ethanol, ethyl acetate, acetone, and dimethylformamide.

The aforementioned mixture is formed into a molded product by heating for drying and conducting binding of the binder due to softening or melting. The heating temperature is selected to be higher than the softening temperature but lower than the decomposition temperature of the binder. The heating may be conducted in the molding vessel by a conventional heater or the like, but can also be conducted effectively by irradiation with an electromagnetic wave permeable into the molded product. The electromagnetic wave includes microwaves and far-infrared rays.

The mixing ratio of the vegetable fiber and the binder is determined depending on the intended performance. A relatively less amount of the binder is liable to cause tearing of the molded product or peeling of the fiber, but will give sufficient flexibility and satisfactory hand feeling. On the other hand, a relatively large amount of the binder will give rigidity of the molded product, and will facilitate foaming extrusion molding and extrusion molding. An additive such as a plasticizer, a thickener, an antioxidant, and a colorant may be added thereto.

For mixing the vegetable fiber with the binder, in the present invention, water is not used, or the ratio of the water in the solvent is decreased in order to significantly shorten the time of heating and drying. The mixing may be conducted during or after the fiber opening with a suitable stirring apparatus. However, the method described below is more effective.

(Promotion of Powder Adhesion)

In dry mixing of the vegetable fiber and the powdery binder, the powdery binder tends to be sieved out from the fiber owing to the size difference. A countermeasure therefor is to suitably wet the fiber to promote the adhesion of the powdery binder onto the fiber.

In this method, a small amount of a liquid is impregnated into the vegetable fiber by spraying or a like method. While the fiber is wet, the powdery binder is sprinkled on the fiber and the fiber is stirred. The aforementioned liquid includes organic solvents such as methanol, ethanol, and dimethylformamide. Water is also useful. However, for shortening the drying time, the content of the water in the liquid ranges preferably from 0 to 50 wt %.

(Spraying of Solution)

In another mixing method, the binder is dissolved or suspended in an organic solvent having a relatively low boiling point, the solution or liquid suspension is sprayed onto the vegetable fiber, and the fiber is dried in situ to deposit the binder on the surface of the fiber. Since excessive penetration of the solution into the fiber may lower the binding efficiency, the spray method and the solvent are selected to avoid the excessive penetration. The solvent includes methanol, ethanol, ethyl acetate, acetone, and tetrahydrofuran.

(Fixation of Binder on Surface)

In the aforementioned production methods, the binder is dispersed in the whole vegetable fiber. However, the copolymer as the binder may be locally added on or near the surface of a pelletized fiber or of a molded fiber.

As described above, a first production process comprises a mixing or adhering step in which small particles like pellets are prepared by a mechanical method, and a binder is allowed to adhere to the surface of the particles; and a molding step in which the particles are filled into a mold and heated therein to melt the binder to bind the pelletized fiber.

In a second production process, the fiber is mechanically formed into an intended shape followed by a mixing step in which the binder is applied onto the surface of the shaped fiber, and the resulting mixture is heated for binding to fix the shape. This method is applicable to entangleable fibers for decreasing the amount of the binder.

The shape of the molded product produced by the aforementioned process can be designed for the use as the cushioning material. As the cushioning article for packing electrical appliances and precision machine products, the fiber-binder mixture is molded in a shape to fit to the profile of the products to be packed. For arranging fruits, eggs, or the like, the fiber-binder mixture is molded in a shape having protrusions and hollows corresponding to the shape of the things to be packed. In other uses, the fiber-binder mixture is molded into pellets or granules to fill the interspace between the packed content and the outer case. Otherwise, the mixture is molded in a sheet for use as a cushioning-wrapping sheet.

Generally, cushioning molded products have sound absorption properties, and are used as sound absorbing materials and building materials. The cushioning molded products of the present invention are also useful for such uses.

(Recyclability)

The cushioning molded product of the present invention can be recycled by a mechanical method in which the product is grinded, heated and remolded, or is subjected to fiber-opening in a solvent and remolded. Moreover, the source materials can be recovered. That is, in the cushioning molded product of the present invention, the copolymer contained as the binder is hydrolyzed and can be depolymerized by an acid, an alkali, high-temperature high-pressure water, or an enzyme. Therefore, under such a condition that the vegetable fiber is hydrolyzed, the saccharide and the aliphatic dicarboxylic acid can be recovered, whereas under such a condition that the vegetable fiber is not hydrolyzed, the vegetable fiber, the saccharide and the aliphatic dicarboxylic acid can be respectively recovered entirely. Through such a recovery process, the source materials can be recycled without deterioration of the quality. In other words, any or all of the vegetable fiber, the saccharide, and the aliphatic dicarboxylic acid can be used again as the source materials for production of the cushioning molded product of the present invention by the production process described above.

The cushioning molded product of the present invention, which is biodegradable owing to the above-mentioned hydrolyzability, will not cause any adverse influence even when it is thrown out into the natural environment.

EXAMPLES

The present invention is specifically explained below by reference to examples.

Synthesis Example 1

The source saccharide was a used-paper decomposition saccharide, which was produced by decomposing office-used paper by action of a cellulase in an acetic acid/sodium acetate buffer solution, and composed of a mixture of mono- to trisaccharide. A mixture of 50 g of this used-paper decomposition saccharide, 400 mL of dimethylformamide, and 200 mL of pyridine was stirred at 80° C. under a nitrogen atmosphere. Thereto, a solution of 40 mL of sebacoyl chloride in 200 mL of dimethylformamide was added gradually dropwise. The resulting mixture was stirred for one hour. After evaporation of a part of the solvent, the reaction mixture was poured into water to obtain a precipitate. The precipitate was dried to obtain 74 g of a colorless powder (saccharide copolymer).

Synthesis Example 2

A 500 g of glucose, 300 g of adipic acid, and 600 mL of acetic anhydride were mixed, and the mixture was stirred at 120° C. for 2 hours to obtain a transparent melt liquid. Thereto, 50 g of zinc chloride was mixed. The mixture was stirred under a reduced pressure of 13.3 kPa (100 mmHg) for one hour, and stirred further under a reduced pressure of 6.7 kPa (50 mmHg) for 2 hours. The melt liquid after the reaction was left for cooling to conduct solidification. The solidified matter was ground, and washed with ethanol and diethyl ether to obtain 770 g of a brown powdery matter (saccharide copolymer).

Example 1

A 10 g of the powdery saccharide copolymer obtained in Synthesis Example 1 was dissolved in 100 mL of ethanol. To this solution, were added 20 g of fluffy used-paper subjected to fiber-opening using a dry fiber-opening machine, and 50 mL of water. The mixture was agitated vigorously. This mixture was filled into a mold, and was heated at 80° C. for one hour. Then the molded product was taken out and dried for one hour. The obtained molded product did not cause peeling of the fiber at the surface and had no corner defect, and could be deformed by hammer blow without breaking, showing cushioning properties.

Example 2

A cushioning molded product was prepared in the same manner as in Example 1 except that the saccharide copolymer obtained in Synthesis Example 2 was used in place of the saccharide copolymer obtained in Synthesis Example 1.

Example 3

A 10 g of wood meal, 10 g of the saccharide copolymer obtained in Synthesis Example 1, and 50 mL of methanol were mixed and stirred. At the time when the solid matter had become a soft paste, the supernatant was removed. To the paste, 0.1 g of azodicarbonamide was added. The mixture was stirred, and then dried to obtain a flake-shaped matter. This flake-shaped matter was heated in a cup-shaped container at 180° C. for 5 minutes to obtain a cylindrical foamed molded product.

Example 4

The components were mixed in the same manner as in Example 1. The mixture was filled in a mold made of Teflon®, and was heated by a microwave oven (700W) for 30 seconds to obtain a cushioning molded product.

Example 5
(Production by Powder Application)

A 20 g of fluffy used paper produced by fiber opening by a dry fiber opening machine was uniformly impregnated with 10 mL of ethanol by spraying. Thereto, 10 g of the powdery saccharide copolymer obtained in Synthesis Example 1 was uniformly sprinkled by use of a sieve (30 mesh), and the mixture was stirred gently. This mixture was filled in a mold, and heated at 80° C. for 30 minutes. The resulting molded product did not cause peeling of the fiber at the surface and had no defective corner, and could be deformed by hammer blow without breaking, showing cushioning properties.

Example 6
(Production by Solution Spraying)

A 10 g of the saccharide copolymer obtained in Synthesis Example 2 was dissolved in 10 mL of acetone. This solution was sprayed onto 30 g of wood meal. After air-drying, the wood meal was gently mixed. This mixture was filled in a mold, and was heated at 80° C. for 30 minutes to obtain a cushioning molded product.

Example 7
(Production by Pelletization and Spraying)

Onto the surface of 50 g of pellets (5 mm diameter) produced from used paper pulp by a granulating-drying machine, was sprayed a solution of 10 g of the saccharide copolymer obtained in Synthesis Example 1 in 10 mL methanol. The pellets were air-dried. Then the pellets were filled in a mold, and were heated at 80° C. for 30 minutes to obtain a cushioning molded product.

Example 8
(Production by Spraying Only Onto Molded Product Surface)

A 20 g of cotton linter was pressed (at 1 MPa) by a pressing machine to form a square sheet of 4 mm thick. Onto the both faces of this sheet, was sprayed a solution of 10 g of the saccharide obtained in Synthesis Example 2 in 10 mL of acetone. The sheet was air-dried, and then heated on a hot plate at 70° C. for 5 minutes. The obtained sheet had surface rigidity and was elastic in the thickness direction.

Example 9

The cushioning molded product prepared in Example 1 was placed in a 1N aqueous sodium hydroxide solution, and was stirred for 24 hours. The resulting slurry was filtered to collect the used paper fiber fraction. The filtrate was neutralized by addition of glacial acetic acid, and was condensed. By liquid separation with diethyl ether, sebacic acid was extracted and recovered. The aqueous phase was allowed to pass through an ion-exchange resin (Amberlite IR-120B, Organo Co.) and was evaporated to dryness to recover the saccharide. The recovered matters were identified by IR spectroscopy. From the recovered matters, a cushioning molded product could be prepared in the same processes as in Synthesis Example 1 and Example 1.

As described above, the present invention provides a cushioning molded product having high strength, high processability, and high recyclability by utilizing maximally a vegetable fiber as the main source material. This cushioning molded product enables decrease of waste materials caused by excessive package, and effective utilization of resources. The cushioning molded product of the present invention, since it is mainly composed of a vegetable fiber, is light in weight and compact in volume, and the product wrapped or packed with the cushioning molded product of the present invention is sufficiently protected against vibration during transportation and drop impact not to be broken, and requires less labor in transportation. The sound absorption material employing the cushioning molding article of the present invention can be molded in any shape depending on places to which the product is used to increase the soundproof effect.

The production process of the present invention readily produces the cushioning molded product by binding the vegetable fiber with the copolymer binder of the saccharide and the aliphatic dicarboxylic acid.

Further, in the production process, the productivity is improved, and the energy consumption is decreased. Furthermore, the decrease of energy consumption in the production process decreases the emission of carbon dioxide, which causes the greenhouse effect.

What is claimed is:

1. A molded product comprising:
    a vegetable fiber; and
    a copolymer of a saccharide and an aliphatic dicarboxylic acid,
    wherein the vegetable fiber is bound by the copolymer.

2. The molded product according to claim 1, wherein the vegetable fiber is a paper fiber or a fiber obtained by fiber opening of paper.

3. The molded product according to claim 1, wherein the saccharide is a monosaccharide, or an oligosaccharide with a polymerization degree of 6 or less.

4. The molded product according to claim 3, wherein the saccharide has 0 to 2 acetyl groups per a monosaccharide unit.

5. The molded product according to claim 1, wherein the saccharide is a product of decomposition of a vegetable fiber.

6. The molded product according to claim 1, wherein the saccharide is a product of decomposition of paper.

7. The molded product according to claim 1, wherein the aliphatic dicarboxylic acid has an alkylene chain having 4 to 10 carbon atoms for the monosaccharide, and 6 to 10 carbon atoms for the oligosaccharide.

8. The molded product according to claim 1, wherein the vegetable fiber is contained at a content ranging from 50 to 99 wt %, and the copolymer is contained at a content ranging preferably from 1 to 50 wt %.

9. The molded product according to claim 1, wherein the copolymer contains a component with a weight-average molecular weight of 500 to 10000 at a content from 50 to 100 wt %.

10. A process for producing a molded product comprising the steps of:
    providing a vegetable fiber, a copolymer of a saccharide and an aliphatic dicarboxylic acid; and
    binding the vegetable fiber with the copolymer,
    whereby the molded product is produced.

11. A process for producing a cushioning molded product from a copolymer of a saccharide and an aliphatic dicarboxylic acid, and a vegetable fiber, comprising the steps of:
    (a) mixing the copolymer with the vegetable fiber, and
    (b) molding a mixture resulting from step (a) into an intended shape by heating the mixture to bind the vegetable fiber with the copolymer.

12. The process for producing a cushioning molded product according to claim 11, wherein the mixing step includes a step mixing the copolymer and the vegetable fiber by use of a solvent containing water at a content ranging from 0 to 50%.

13. The process for producing a cushioning molded product according to claim 11, wherein the step (a) includes a step of sprinkling powder of the copolymer onto a vegetable fiber impregnated with an organic solvent to allow the copolymer to adhere onto the fiber.

14. The process for producing a cushioning molded product according to claim 11, wherein the step (a) includes a step of spraying a solution of the copolymer in an organic solvent onto the vegetable fiber followed by drying to allow the copolymer to adhere onto the vegetable fiber.

15. The process for producing a cushioning molded product according to claim 11, wherein the step (b) includes the steps of filling the mixture of the copolymer and the vegetable fiber into a molding vessel, and heating the mixture to bind the vegetable fiber with the copolymer.

16. The process for producing a cushioning molded product according to claim 11, wherein the step (b) includes a step of softening or melting the copolymer by heating.

17. The process for producing a cushioning molded product according to claim 16, wherein the heating is conducted by irradiation of electromagnetic waves.

18. A process for producing a cushioning molded product from a copolymer of a saccharide and an aliphatic dicarboxylic acid, and a vegetable fiber, comprising the steps of:
    (a) adhering the copolymer with a pelletized vegetable fiber,
    (b) filling a mixture of the pelletized vegetable fiber and the copolymer resulting from step (a) into a molding vessel, and
    (c) molding the mixture into an intended shape by heating the mixture to bind the vegetable fiber with the copolymer.

19. The process for producing a cushioning molded product according to claim 18, wherein the step (a) includes a step of sprinkling powder of the copolymer onto a pelletized vegetable fiber impregnated with an organic solvent to allow the copolymer to adhere onto the pelletized vegetable fiber.

20. The process for producing a cushioning molded product according to claim 18, wherein the step (a) includes a step of spraying a solution of the copolymer in an organic solvent onto the pelletized vegetable fiber followed by drying to allow the copolymer to adhere onto the pelletized vegetable fiber.

21. The process for producing a cushioning molded product according to claim 18, wherein the step (c) includes a step of softening or melting the copolymer by heating.

22. The process for producing a cushioning molded product according to claim 21, wherein the heating is conducted by irradiation of an electromagnetic wave.

23. A process for producing a cushioning molded product from a copolymer of a saccharide and an aliphatic dicarboxylic acid, and a vegetable fiber, comprising the steps of:

(a) forming the vegetable fiber into an intended shape, (b) adhering the copolymer with the vegetable fiber, and (c) molding a mixture of the vegetable fiber and the copolymer resulting from step (b) by heating the mixture to bind the vegetable fiber with the copolymer.

24. The process for producing a cushioning molded product according to claim 23, wherein the step (b) includes a step of sprinkling powder of the copolymer onto the vegetable fiber impregnated with an organic solvent to allow the copolymer to adhere onto the vegetable fiber.

25. The process for producing a cushioning molded product according to claim 23, wherein the step (b) includes a step of spraying a solution of the copolymer in an organic solvent onto the vegetable fiber followed by drying to allow the copolymer to adhere onto the vegetable fiber.

26. The process for producing a cushioning molded product according to claim 23, wherein the step (c) includes a step of softening or melting the copolymer by heating.

27. The process for producing a cushioning molded product according to claim 26, wherein the heating is conducted by irradiation of an electromagnetic wave.

28. A process for recovery of a molded product comprising a step of recovering at least one of the vegetable fiber, saccharide, and aliphatic dicarboxylic acid from the molded product set forth in claim 1 by treating the molded product with at least one of an acid, an alkali, high-temperature high-pressure water, and an enzyme.

29. A molded product comprising a vegetable fiber as a main constituent, and a copolymer of a saccharide and an aliphatic dicarboxylic acid as a binder, wherein at least one of the vegetable fiber, the saccharide, the aliphatic dicarboxylic acid is a product recovered by the recovery process as set forth in claim 28.

30. A package packed with the molded product as set forth in claim 1.

31. Matter wrapped with the molded product as set forth in claim 1.

32. A sound absorption material comprising the molded product as set forth in claim 1.

33. A building material comprising the molded product as set forth in claim 1.

* * * * *

UNITED STATES PATENT AND TRADEMARK OFFICE
CERTIFICATE OF CORRECTION

PATENT NO.     : 6,793,992 B2
DATED          : September 21, 2001
INVENTOR(S)    : Yoshihiko Kikuchi et al.

It is certified that error appears in the above-identified patent and that said Letters Patent is hereby corrected as shown below:

Title page,
Item [56], References Cited, FOREIGN PATENT DOCUMENTS, "2000-297206" should read -- 2000-297205 --.

Signed and Sealed this

First Day of February, 2005

JON W. DUDAS
*Director of the United States Patent and Trademark Office*